(12) United States Patent
Jönsson et al.

(10) Patent No.: US 9,327,424 B2
(45) Date of Patent: May 3, 2016

(54) ELECTRIC SAW COMMUNICATION

(75) Inventors: Andreas Jönsson, Åsbro (SE); Magnus Lundgren, Jönköping (SE); Bengt-Allan Bergvall, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 745 days.

(21) Appl. No.: 12/920,089

(22) PCT Filed: Feb. 29, 2008

(86) PCT No.: PCT/SE2008/050228
§ 371 (c)(1),
(2), (4) Date: Nov. 8, 2010

(87) PCT Pub. No.: WO2009/108093
PCT Pub. Date: Sep. 3, 2009

(65) Prior Publication Data
US 2011/0056716 A1    Mar. 10, 2011

(51) Int. Cl.
*B25F 5/00* (2006.01)
*H02K 11/00* (2006.01)
(Continued)

(52) U.S. Cl.
CPC ............... *B28D 1/045* (2013.01); *B23D 47/08* (2013.01); *B23D 47/12* (2013.01); *B23D 59/002* (2013.01); *B28D 1/044* (2013.01); *H02P 5/74* (2013.01); *H02P 6/04* (2013.01); *H02P 6/16* (2013.01)

(58) Field of Classification Search
CPC ...... B23D 47/08; B23D 59/002; B23D 47/12; B28D 1/045; B28D 1/044; H02P 6/16; H02P 5/74

USPC .......... 83/13, 471–473, 578, 428, 169; 451/5, 451/350; 404/87, 90; 125/14, 12–13.03; 318/400.38, 254, 138, 439, 260–293, 318/603–696; 250/231.13, 231.16; 700/160, 159, 169, 170, 191–193; 299/1.05, 1.5, 1.6, 36.1, 39.1–39.3, 42, 299/55, 56, 39
See application file for complete search history.

(56) References Cited

U.S. PATENT DOCUMENTS 4,436,013 A * 3/1984 Gerber ........................... 83/747
4,479,078 A 10/1984 Kidd et al.
(Continued)

FOREIGN PATENT DOCUMENTS

CN    2387675    7/2000
DE    19737617 A1    3/1999
(Continued)

OTHER PUBLICATIONS

"Wall Saw WX-15", Product Information Brochure, Tyrolit Hydrostress AG, Oct. 21, 2005.
(Continued)

*Primary Examiner* — Ghassem Alie
(74) *Attorney, Agent, or Firm* — Nelson Mullins Riley & Scarborough LLP (57) ABSTRACT

Electric saw being powered by an external power supply through a multicore cable. The multicore cable includes electrical wires for supplying power to the motors of the electric saw and communication wires for data communication between the electric saw and the power supply. Two motors of the electric saw are three phase permanent magnet motors, with an outer rotor and an inner stator. Each of the two motors has three Hall Effect sensors located around the outer rotor.

9 Claims, 7 Drawing Sheets

(51) Int. Cl.
  *H02K 29/08* (2006.01)
  *B28D 1/04* (2006.01)
  *B23D 47/08* (2006.01)
  *B23D 47/12* (2006.01)
  *B23D 59/00* (2006.01)
  *H02P 5/74* (2006.01)
  *H02P 6/04* (2016.01)
  *H02P 6/16* (2016.01)

(56) References Cited

U.S. PATENT DOCUMENTS

| | | | |
|---|---|---|---|
| 4,755,699 A * | 7/1988 | Schmider | 310/68 R |
| 4,896,288 A * | 1/1990 | Gonnering et al. | 710/260 |
| 4,998,775 A * | 3/1991 | Hollifield | 299/39.3 |
| 5,506,485 A * | 4/1996 | Mueller et al. | 318/600 |
| 5,687,103 A | 11/1997 | Hagl et al. | |
| 5,788,428 A | 8/1998 | Ward et al. | |
| 5,887,579 A | 3/1999 | Eriksson et al. | |
| 5,912,541 A | 6/1999 | Bigler et al. | |
| 5,942,863 A * | 8/1999 | Wada | 318/400.04 |
| 6,144,183 A | 11/2000 | Kawai | |
| 6,184,639 B1 | 2/2001 | Wallner | |
| 6,955,167 B2 | 10/2005 | Baratta | |
| 7,143,743 B2 * | 12/2006 | Uda et al. | 123/399 |
| 7,180,261 B1 | 2/2007 | Tsai | |
| 2002/0101122 A1 * | 8/2002 | Haines et al. | 310/68 E |
| 2003/0121694 A1 | 7/2003 | Grogl et al. | |
| 2005/0260923 A1 * | 11/2005 | Tagscherer | 451/5 |
| 2006/0113951 A1 * | 6/2006 | Wada et al. | 318/801 |
| 2006/0189258 A1 * | 8/2006 | Schaer et al. | 451/5 |
| 2006/0201492 A1 | 9/2006 | Baratta et al. | |
| 2007/0031232 A1 * | 2/2007 | Kurebayashi et al. | 414/682 |
| 2007/0163412 A1 | 7/2007 | Baratta et al. | |
| 2008/0143285 A1 * | 6/2008 | Lucas | 318/400.24 |
| 2009/0078058 A1 * | 3/2009 | Aoki et al. | 73/862.335 |

FOREIGN PATENT DOCUMENTS

| | | |
|---|---|---|
| EP | 1327994 A2 | 7/2003 |
| EP | 1818742 A2 | 8/2007 |
| GB | 2287622 A | 9/1995 |
| WO | 2009108093 A1 | 9/2009 |

OTHER PUBLICATIONS

Braxx Wall Saws, Aug. 27, 2010, Retrieved from: http//www.eurodima.com/en/products/sawing/braxx-system/braxx-wall-saws; pp. 1-2.

Braxx Control Units, Aug. 27, 2010, Retrieved from: http://www.eurodima.com/en/products/sawing/braxx-system/braxx-control-units; pp. 1-2.

Braun Wall Saws, Aug. 27, 2010, Retrieved from: http//www.braun.at/en/4/wall_saw.html; pp. 1-2.

"Fully Integrated BLDC Motor Control from the Signal Generation to the Full BLDC Motor Control Chain", ATMEL/Fully Integrated BLDC Motor Control/ Application Note, 4987A-AUTO-03/07, see p. 2-p. 6; figures 2-1; 5-1; 6-3.

International Preliminary Report on Patentability for International Application No. PCT/SE2008/050228, dated Jun. 14, 2010.

International Search Report for International Application No. PCT/SE2008/050228, dated Feb. 11, 2009.

International Written Opinion for International Application No. PCT/SE2008/050228, dated Feb. 11, 2009.

English Abstract of Chinese Publication No. 2387675 dated Jul. 12, 2000.

English Abstract of German Patent Application No. 19737617 dated Mar. 11, 1999.

* cited by examiner

| Data code index | Information code | |
|---|---|---|
| 1 | 0 0 0 0 | Stop bit for slow message |
| 2 | 0 0 0 1 | Electrical position ⑥, motor 12 |
| 3 | 0 0 1 0 | Electrical position ④, motor 12 |
| 4 | 0 0 1 1 | Electrical position ⑤, motor 12 |
| 5 | 0 1 0 0 | Electrical position ②, motor 12 |
| 6 | 0 1 0 1 | Electrical position ①, motor 12 |
| 7 | 0 1 1 0 | Electrical position ③, motor 12 |
| 8 | 0 1 1 1 | Start bit for slow message |
| 9 | 1 0 0 0 | Data bit = 0 for slow message |
| 10 | 1 0 0 1 | Electrical position ⑥, motor 13 |
| 11 | 1 0 1 0 | Electrical position ④, motor 13 |
| 12 | 1 0 1 1 | Electrical position ⑤, motor 13 |
| 13 | 1 1 0 0 | Electrical position ②, motor 13 |
| 14 | 1 1 0 1 | Electrical position ①, motor 13 |
| 15 | 1 1 1 0 | Electrical position ③, motor 13 |
| 16 | 1 1 1 1 | Data bit = 1 for slow message |

ELECTRIC SAW COMMUNICATION

TECHNICAL FIELD

The present invention relates to electrical saws, such as portable wall saws or wheeled floor saws, with external power supplies, more particular an electrical motor thereof, a method for communicating information from the electric saw to the power supply, a communication protocol facilitating communication between the power supply and the electric saw.

BACKGROUND ART

Construction machinery is used in renovating, reconstructing and extending buildings, for example. Wall saws are used for cutting and extending openings for doors, windows and light wells, etc., corrective work on facades, partition walls and garden walls, etc., and controlled demolition of concrete. Wall saws and similar construction machinery have a prime mover, such as a motor, and a rotary tool driven by the motor.

A wall saw usually includes a rack, i.e. a toothed bar or rod, intended to be attached to and equidistantly spaced from the wall, which is to be sawed through. A carriage carries a drive motor for the circular saw blade and is movable along the rack by means of another motor. The saw blade is mounted at the free end of a pivotal arm attached to the carriage and housing a transmission for transferring the rotation of the drive motor shaft to the saw blade. The pivotal arm, or transmission housing, is swung toward and away from the wall by a third motor.

In a wall saw, the tool is a circular saw blade equipped with cutting diamond segments. Generally, heavy duty wall saws are driven hydraulically, see U.S. Pat. No. 6,955,167 B2, US 2006/0201492 A1, US 2007/0163412 A1, and U.S. Pat. No. 5,887,579, for example. However, hydraulic wall saws are comparatively heavy and not easy to set up, and comparatively low-weight electric wall saws, such as the one disclosed in US 2006/0189258 A1, for example, have been introduced on the market.

In US 2006/0189258 A1 the saw process is at least partly automated by using a control program that is realized with programmable control means, displacement sensor, and pivot angle sensor.

SUMMARY OF THE INVENTION

It is an object of the invention to provide an electric saw being portable and/or wheeled, such as a wall saw or a floor saw comprising a circular rotatable saw blade and a drive motor, which electric saw can easily be handled. This object is achieved by an electric saw being powered by an external power supply through a multicore cable that also includes communication wires for data communication between the electric saw and the power supply. An electric saw using an external power supply where the power supply and communication wires are in one single multicore cable makes the handling of the electric saw easier, since less cables needs to be used.

Preferably, in the electric saw said drive motor is a first electric motor for driving the saw blade, and the electric saw preferably further comprises a second electric motor for moving the wall saw along a surface to be sawn, and a third electric motor for raising and lowering the saw blade. The multicore cable includes wire means for individually powering each motor. Each motor is preferably a three phase electrical motor and the wire means for individually powering each motor includes three wires for each motor.

Preferably, the electric saw comprises a rack intended to be fastened to, or in close proximity to, an object to be sawn so that movable parts of the saw can move along the rack during sawing.

Preferably, the multicore cable further comprises two wires for data transfer.

Preferably the multicore cable comprises four wires for communication with wall saw electronics, namely a wire for voltage feed of +12V for the wall saw electronics, an earth/ground wire (GND) for the wall saw electronics, and the two wires for data transfer. The two wires for data transfer are preferably twisted.

Preferably the communication wires are used for transmitting the electrical position or position change of at least one of the second motor and third motor to the power supply. The power supply preferably includes commutation means, preferably in the form of Pulse Width Modulators (PWM), for commutating the electrical phases for the corresponding second motor and/or third motor based on the received electrical position or positional change of the motor thereof.

Another object of the invention is to provide a three phase electrical motor with Hall Effect sensors that can be easily adjusted in position. This object is achieved by providing a three phase electrical motor having an inner stator and an outer rotor comprising a plurality of permanent magnets with at least three Hall Effect sensors mounted around the periphery of the outer rotor for determining the electrical position and/or electrical positional change by monitoring the leak magnetic flux of the permanent magnets. By having the Hall Effect sensors mounted around the periphery the Hall Effect sensors can easily be accessed for adjusting their position.

Preferably the Hall Effect sensors are mounted on a common ring shaped circuit board, each Hall Effect sensor mounted at predetermined angular positions. Preferably, the ring shaped circuit board can at least to some extent be rotably adjusted. By mounting the Hall Effect sensors on a ring shaped circuit board their position in relation to the stator can be easily adjusted while maintaining their mutual position.

Preferably the number of Hall Effect sensors is three, which preferably are evenly distributed around the ring shaped circuit board, i.e. angularly displaced by 120°.

Preferably the sensor output from the Hall Effect sensors are used to determine the electrical position or electrical positional change of the rotor.

Another object of the invention is to provide a method for transmitting sensor data from the electric saw to the power supply. This is achieved by providing a method for controlling an electric saw including: a first motor for driving a saw blade, a second motor for moving the electric saw along a surface to be sawn, and a third motor for raising and lowering the saw blade, and an external power supply adapted to deliver a phase commuted voltage for driving at least one of the second and third motors, the method comprising the steps of:

a) monitoring the electrical position and/or electrical positional change of the second and/or third motor to be driven;
b) transmitting said monitored electrical position and/or electrical positional change to the external power supply; and
c) delivering a three phase commuted voltage to the second and/or third motor to be driven, which phase commutation is based on the electrical position and/or positional change of the corresponding motor.

Preferably the second motor and the third motor are three phase permanent magnet motors, both preferably driven by a phase commuted voltage according to step a)-c).

Preferably the electrical position and/or positional change is sent as a fast packet according to the protocol described below.

Preferably a temperature, preferably the temperature of the saw blade motor, is monitored at the electric saw, which temperature is sent as a slow message according to the protocol described below.

Figure 8:
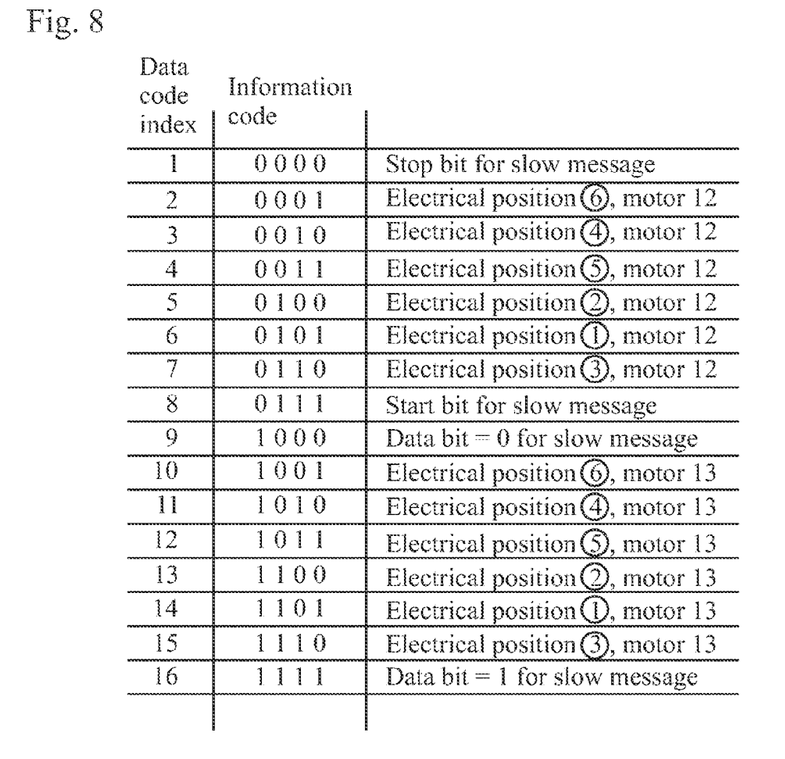
FIG. 8 shows the information codes used to represent the electrical positions of two motors as well as binary bits of a slow message.

A communication protocol for serial communication between an electric saw and an external power supply for powering the electric saw is also proposed, where data is sent through a binary serial bit stream having fixed length packets of n bits each, where n is an integer. Each packet includes one of a predetermined set of information codes comprised in a first and a second subset, respectively, where the packets including the information code comprised in the first subset (data code index 2-7 and 10-15 of FIG. 8) are referred to as fast packets which information codes of the first subset each represents a complete message and where the packets including the information code comprised in the second subset (data code index 1,8,9,16 of FIG. 8) are referred to as slow packets which information codes of the second subset each represents a part of a slow message(s).

Preferably each packet is preceded by a start bit and followed by one or more stop bits.

Preferably a first information code of the second subset represents a slow binary bit in the slow message(s) of value 0 and wherein a second information code of the second subset represents a slow binary bit in the slow message(s) of value 1.

Preferably the slow message(s) is built up from a predetermined number m of slow bits, where m is an integer.

Preferably each slow message is preceded by a slow start bit and followed by a slow stop bit, and wherein a third information code of the second subset represents the slow start bit for the slow message and wherein a forth information code of the second subset represents the slow stop bit for the slow message.

Preferably each packet includes a redundancy or checksum code corresponding to the information code for reducing the risk of information losses.

Preferably a first predetermined number of members of the first subset each correspond to an electrical position or positional change of a second permanent magnet motor.

Preferably a second predetermined number of members of the second subset each corresponds to an electrical position or positional change of a third permanent magnet motor.

Preferably a first condition for sending a slow message is that a fast packet with the electrical position or positional change of a second permanent magnet motor recently has been sent, i.e. within a predetermined time period, preferably within 1 ms.

Preferably a second condition for sending a slow message is that another fast message with electrical position or positional change of a third permanent magnet motor also recently has been sent, i.e. within a predetermined time period, preferably within 1 ms.

BRIEF DESCRIPTION OF THE DRAWINGS

In the following, the invention will be described in more detail with reference to preferred embodiments and the appended drawings.

DETAILED DESCRIPTION OF PREFERRED EMBODIMENTS OF THE INVENTION

Broadly, the present invention relates to a construction machine having a prime mover, a rotatable tool driven by the prime mover, and a transmission for interconnecting an output shaft of the prime mover to the rotatable tool in order to transform an unsuitable high speed and low torque of the prime mover output shaft to a more useable lower speed with higher torque at the rotatable tool. An exemplary embodiment of such a construction machine is a wall saw having a motor, a circular saw blade driven by the motor, and a transmission for interconnecting an output shaft of the motor to the rotatable saw blade. In spite of its name, a wall saw might as well be used for sawing through a floor or a ceiling.

Figure 1:
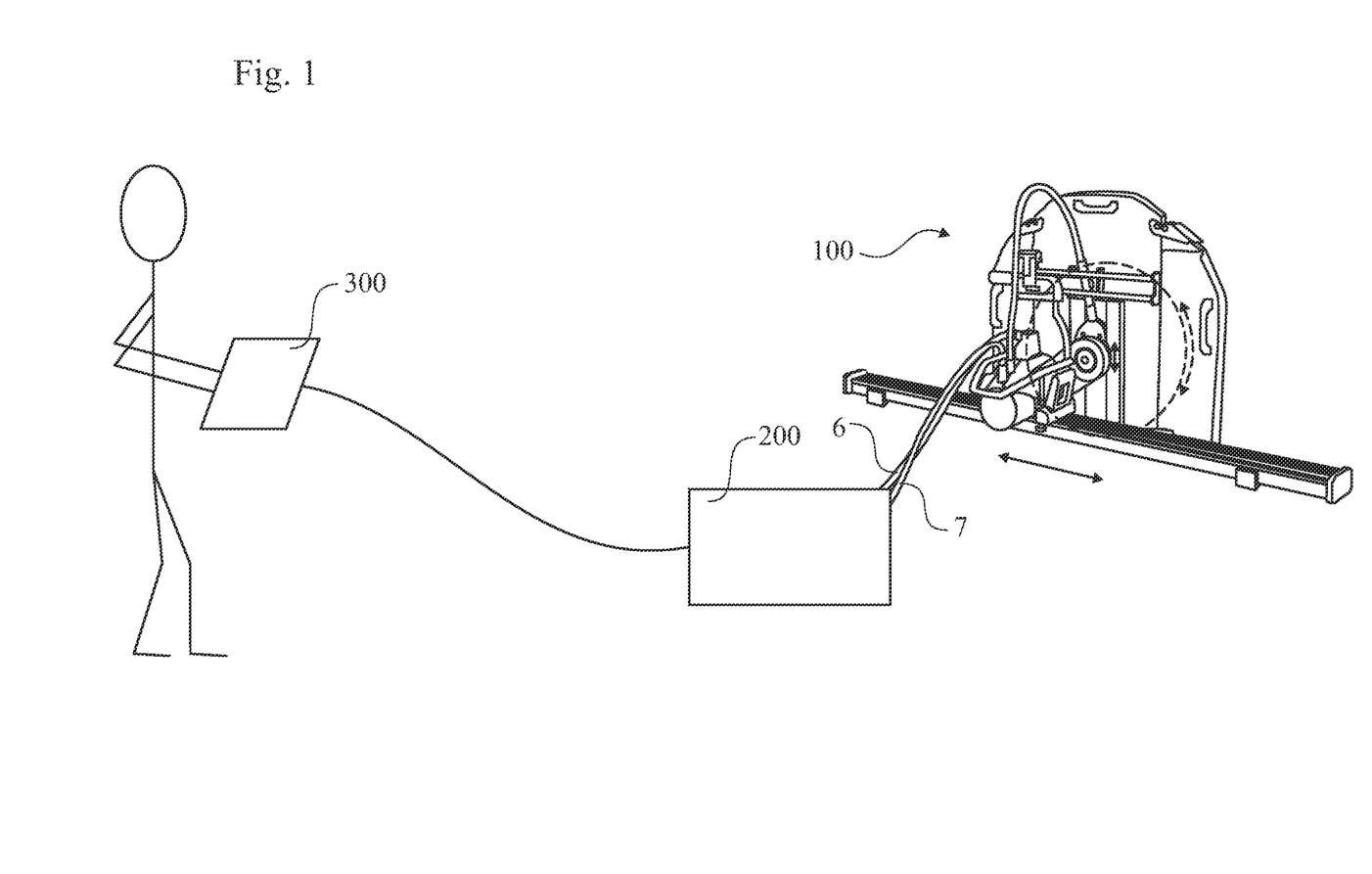
FIG. 1 shows a wall saw with an external power supply and a remote control unit.

FIG. 1 is an overview of a wall saw system, including a wall saw assembly 100, an external power supply 200, and a remote control unit 300. The power supply 200 supplies power through a cable 6 to the wall saw assembly 100, and also receives feedback data from the wall saw assembly 100 via the cable 6. Cooling water is fed via the power supply 200 to the wall saw assembly 100 through hose 7. The power supply 200 is preferably powered by an electric grid. The remote control unit 300 controls the motors of the wall saw assembly 100 by controlling the power output in the power supply 200.

Figure 2:
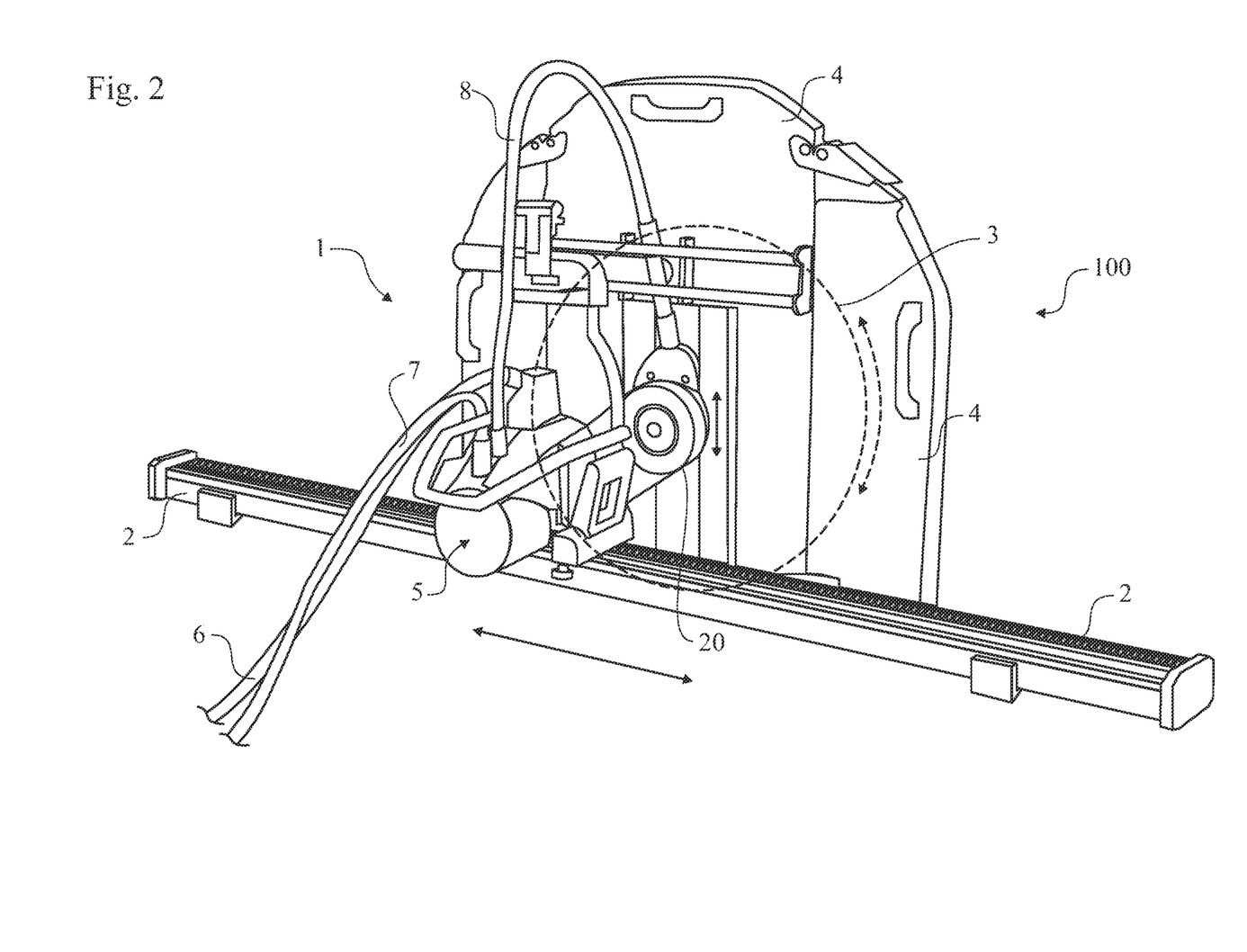
FIG. 2 is a perspective view of a wall saw movable along a toothed rack and having a circular saw blade driven by a motor via a transmission.

FIG. 2 is a perspective view of a wall saw assembly 100, which is positioned to saw through a floor. The wall saw assembly 100 includes a wall saw 1 that is movable along a toothed rack 2 and has a circular saw blade 3 inside a protective hood 4, and, therefore, shown in a dashed line, and driven by a heavy-duty first electric motor 5 via a transmission 21.

In the shown embodiment, the wall saw 1 has two additional electrical motors 12, 13 (hidden in FIG. 2), namely a second motor 12 (see FIG. 3-5) for moving the wall saw 1 along the toothed rack 2, which is intended to be mounted on the "wall" where an opening is to be sawn, and a third motor 13 (see FIG. 3-5) for raising and lowering the saw blade 3. The cable 6 is connected to the wall saw 1 for supplying power to the motors 5, 12, 13 and for transferring control data between a power supply 200 (see FIG. 5), and the motors 5, 12, 13. Cooling water is fed to the wall saw 1 through a first hose 7 for cooling the first motor 5, and through a second hose 8 it is passed on to a central area of the saw blade 3 to cool the saw blade and bind dust formed on sawing.

All three motors 5, 12, 13 are individually powered from the external power supply 200 (see FIG. 1, FIG. 5), which to each motor delivers a three phase current. The cable 6 is a multicore cable including three electrical wires 24, 25, 27 (see FIG. 5) for each motor 5, 12, 13, i.e. one for each phase, and three signal wires 26 (see FIG. 5) including two conductors and an earth/ground at either the wall saw 100 or the power supply 200.

Figure 3:
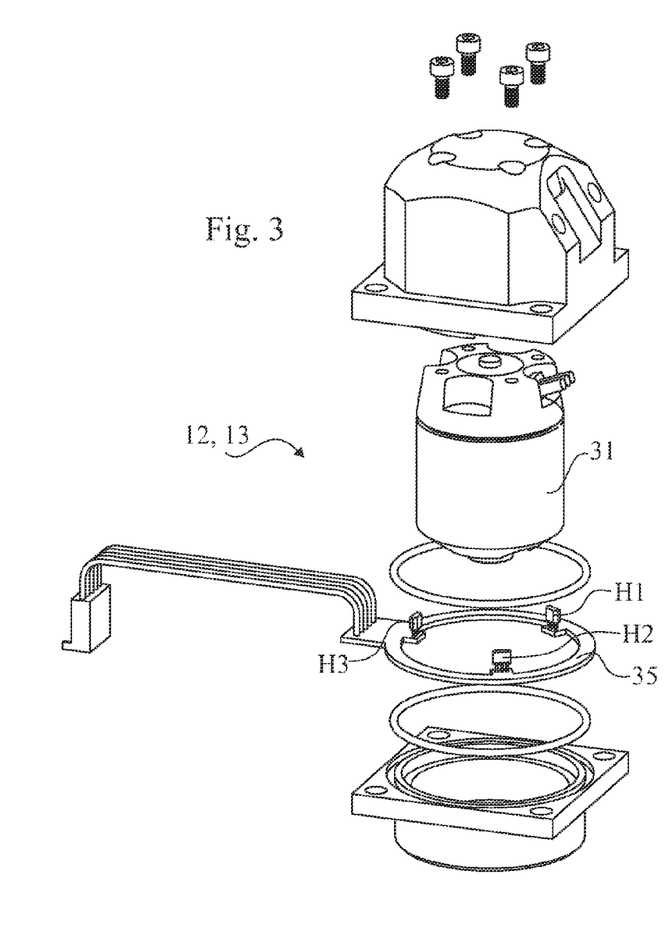
FIG. 3 is an exploded view of an electric motor used in the wall saw.
Figure 4:
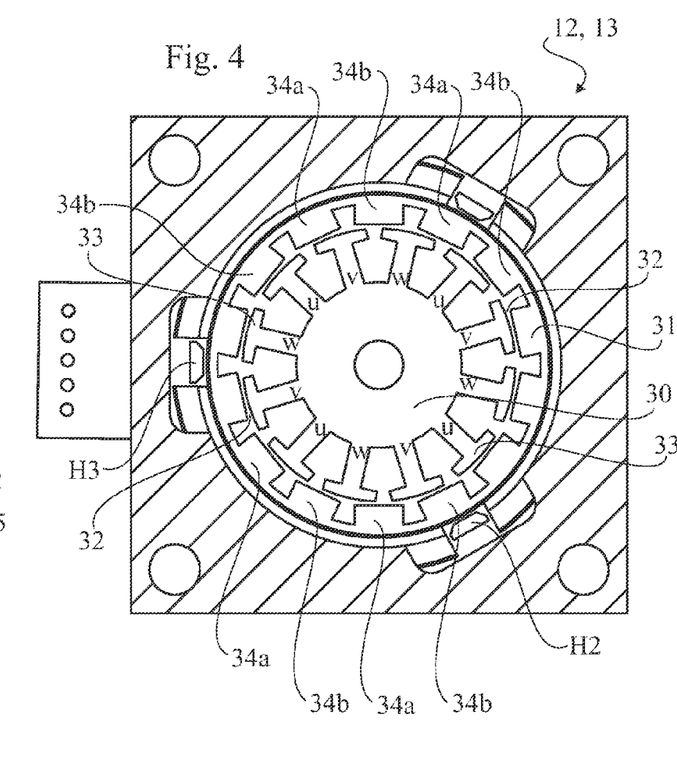
FIG. 4 is a cross section of the motor showing an inner stator and an outer rotor with permanent magnets.
Figure 5:
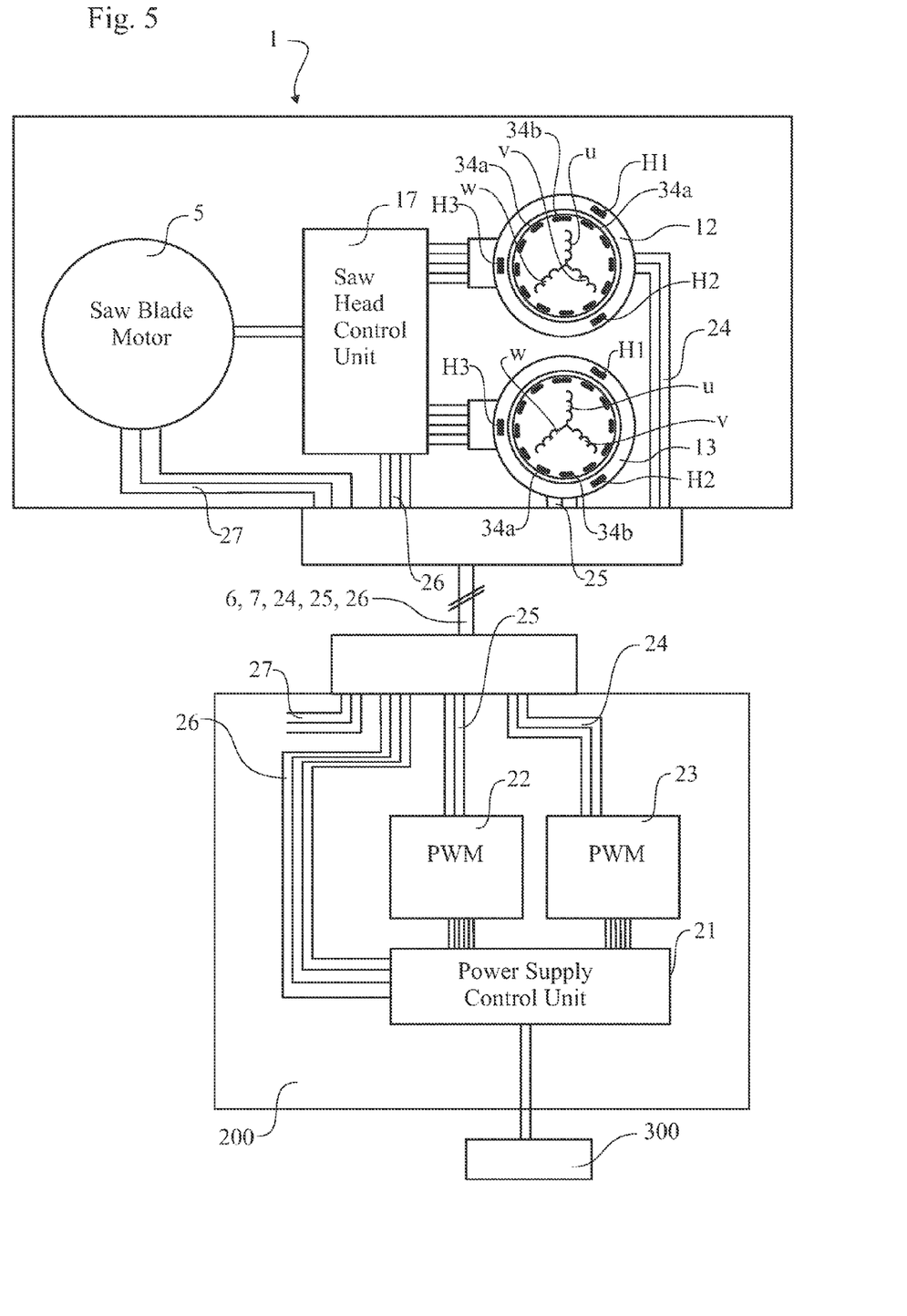
FIG. 5 shows a circuit scheme over the power supply and the wall saw.

As seen in FIG. 3-5, the second motor 12 and the third motor 13 each comprises an inner stator 30 and an outer rotor 31 separated from the inner stator by an air gap 32. The inner stator 30 has three coils U, V, W distributed on twelve teeth 33, one coil for each phase, where the first coil U is wound around the $1^{st}$, $4^{th}$, $7^{th}$ and $10^{th}$ tooth, the second coil V is wound around the $2^{nd}$, $5^{th}$, $8^{th}$ and $11^{th}$ tooth, and the third coil W is wound around the $3^{rd}$, $6^{th}$, $9^{th}$ and $12^{th}$ tooth.

The rotor 31 comprises an even number of permanent magnets 34a, 34b, here fourteen, with every second magnet 34a having their north pole facing the stator 30 and every other second magnet 34b having their south pole facing the stator 30. The number of magnetic pole pairs, i.e. seven in this case, in the rotor 31 affects the step size and torque ripple of the motor 12, 13, where more pole pairs gives smaller steps and less torque ripple.

To make the rotor 31 rotate in one direction the coils U, V, W are sequentially energized. Running the sequence in reverse order makes the rotor 31 run in the opposite direction. By alternating (commuting) the current flow in the coils U, V, W and thereby the polarity of the magnetic fields at the right moment and in the right sequence, the rotor 31 will turn. A three-phase BLDC (BrushLess Direct Current) motor has six states of commutation. When all six states in the commutation sequence have been performed the sequence is repeated to continue the rotation, i.e. the commutation sequence corresponds to a full electrical cycle, which for a motor with multiple poles does not correspond to a full mechanical rotation.

Figure 6:
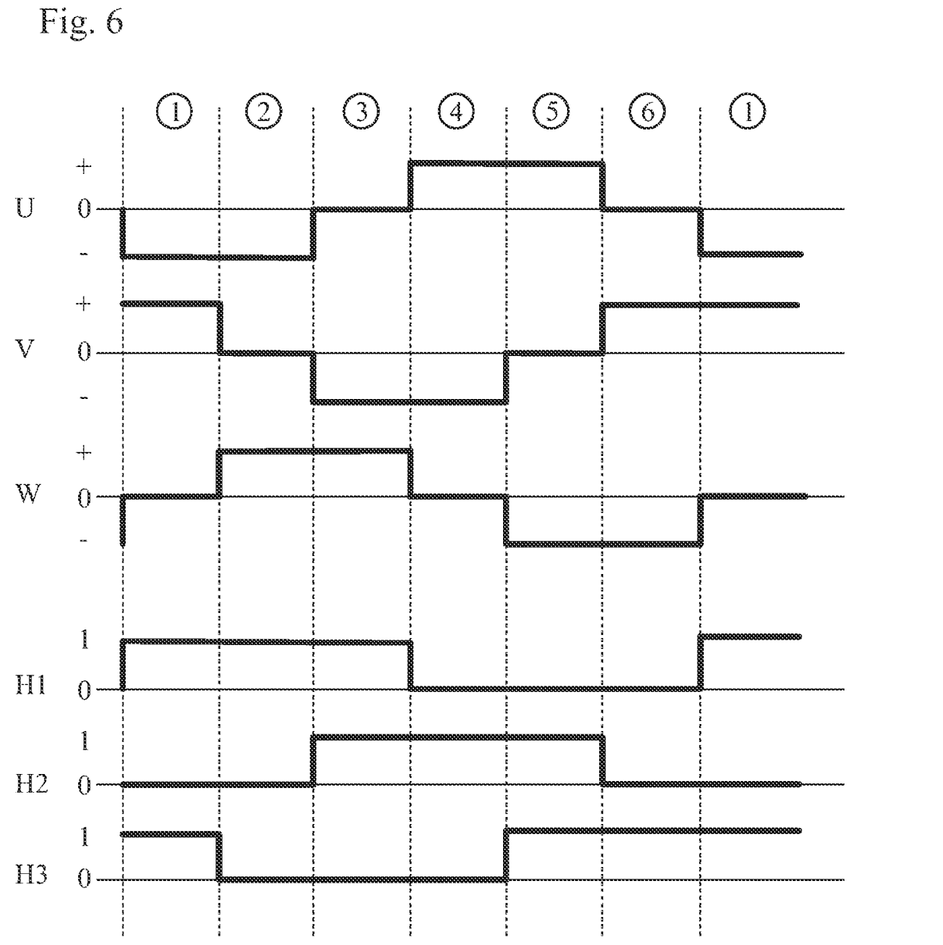
FIG. 6 shows the electrical commutations over the electrical cycle of a three phase motor and corresponding Hall Effect sensor outputs.

In FIG. 6 a commutation scheme which is used individually for each of second and third motor is shown. The coil U, V, W is either conducting in one or the other direction, or not conducting. During one electrical cycle (6 steps), there are two steps during which there is no current in the respective coil U, V, W, and during each step, there are always two of the three coils U, V, W that are biased; one in one direction and the other in the opposite direction. Further, by varying the current amplitude through the coils U, V, W the speed and torque of the motor can be varied.

The second and the third motor 12, 13 are booth three phase brushless DC motors that use feedback from three Hall-effect sensors H1, H2, H3 to perform the commutation of the phases. The Hall Effect sensors H1, H2, H3 are positioned around the periphery of the rotor 31 angularly displaced by 120°. These Hall-effect sensors H1, H2, H3 provide a saw head control unit 17 with the electrical position of the rotor 31 in relation to the stator 30. Thus, when the Hall Effect sensor H1, H2, H3 outputs change, this is reported to the saw head control unit 17. Each Hall Effect sensor outputs a binary signal, the change of this signal from 0->1 or 1->0 is quick action which as soon as possible should be transmitted over the signal cables in cable 6, which could be around 10 meters long, to the power supply control unit 21 for controlling the voltage commutation U, V, W.

Figure 7:
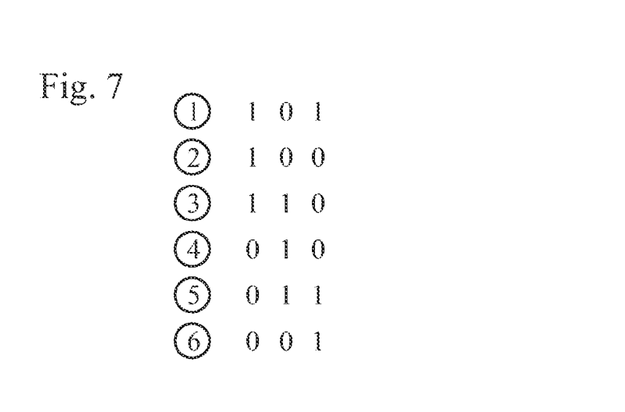
FIG. 7 shows the binary codes for the Hall sensor outputs for each electrical position.

During each electrical cycle and from respectively Hall Effects sensors H1, H2, H3, six positions are provided for each motor 12, 13 as seen in FIG. 6 and FIG. 7 corresponding to the six states of commutation for the coils U, V, W also shown in FIG. 5. Of course, each motor 12, 13 having individual commutation.

For each motor 12, 13 the three Hall Effect sensors are mounted on a ring shaped circuit board 35, adapted to circumcise the rotor 31. Thus according to an aspect of the invention the Hall Effect sensors H1, H2, H3 are not positioned at the inner stator 30, but rather around the outer rotor 31, where it measures the magnetic leak flow as the rotor 31 rotates. The ring shaped board 35 can be slightly adjusted around the outer rotor 31, so that position of the Hall Effect sensors in relation to the stator windings can be tuned, i.e. finding an optimal position of the Hall Effects sensors H1, H2, H3, which is preferably when using them to control commutation of the electrical phases.

The saw head control unit 17 receives outputs from the Hall Effect sensors H1, H2, H3 of both the second and the third motor 12, 13. The saw head control unit 17 may also receive outputs from other sensors, such as a temperature sensor of the first motor 5. The saw head control unit 17 reports these sensor outputs to a power supply control unit 21 of the power supply 200 according to a method described in relation to FIG. 6-8. The power supply control unit 21 use this feedback information to determine the commutation state corresponding to the Hall Effect sensor outputs to control the phase shifting of two Pulse Width Modulators 22, 23, one for each motor 12, 13. The commutation is in accordance with conventional PWM control of brushless DC motors using three Hall Effect sensors H1, H2, H3 and will therefore not be described in more detail. However, in relation to FIG. 6-8 we will describe how to efficiently deliver the positional data from the Hall Effect sensors H1, H2, H3 of both motors 12, 13 to the power supply unit.

The saw head control unit 17 communicates to the power supply control unit 21 by using the standard EIA-485 (formerly RS-485 or RS485) which is a standard for serial communication. The RS485 signals are floating and each signal is transmitted over an S+ line and an S− line. The RS485 receiver, i.e. the power supply control unit 21, compares the voltage difference between both lines S+, S−, as compared to the absolute voltage level on a signal line. Therefore several volts of difference in the ground level of the RS485 transmitter, the saw head control unit 17, and the RS485 receiver, the power supply control unit 21, do not cause any problems, thereby preventing the occurrence of ground loops, a common source of communication problems. If noise is generated by magnetic fields from the environment, the best results are achieved if the S+ and S− lines are twisted. It is also possible to combine twisting and shielding of the S+ and S− lines. The Shield is connected to earth/ground at one end only and provides shielding against induced noise. There is no need for the sender to explicitly turn the RS485 driver on or off since the RS485 drivers automatically return to their high impedance tri-state within a few microseconds after the data has been sent. Therefore it is not needed to have delays between the data packets on the RS485 bus. The signal cables can very well be around 10 m long.

In FIG. 6 it is shown the current control to the coils U, V, W in relation to the sensor outputs from the Hall Effect sensors H1, H2, H3. As seen in FIG. 6-7, the sensor output from the three Hall Effects sensors H1, H2, H3 of one motor 12, 13 provides six rotor positions (1)-(6) which corresponds to the commutations of the coils U, V, W.

Since there are two motors 12, 13 that are controlled through their respective Hall Effect sensor feedback, there are additionally six rotor positions, i.e. twelve possible electrical positions of the rotor 31 for both motors 12, 13 all together.

A nibble (4-bits) can represent sixteen unique information codes (see FIG. 8) and if twelve of those (e.g. code index 2-7, and 10-15) are taken by the Hall Effect sensor feedback from the two motors 12, 13; there remain four available information codes (e.g. code index 1, 8, 9, 16). These remaining information codes are used for providing the possibility to send a slow message, where one of the remaining information codes is used for providing a start bit in a slow message, e.g. code index 8 of FIG. 8, and another one a stop bit in a slow message, e.g. code index 1 of FIG. 8, yet another the data bit=0 in the slow message, e.g. code index 9 of FIG. 8, and the last one of the four remaining information codes the data bit=1 in the slow message, e.g. code index 16 of FIG. 8.

Figure 10:
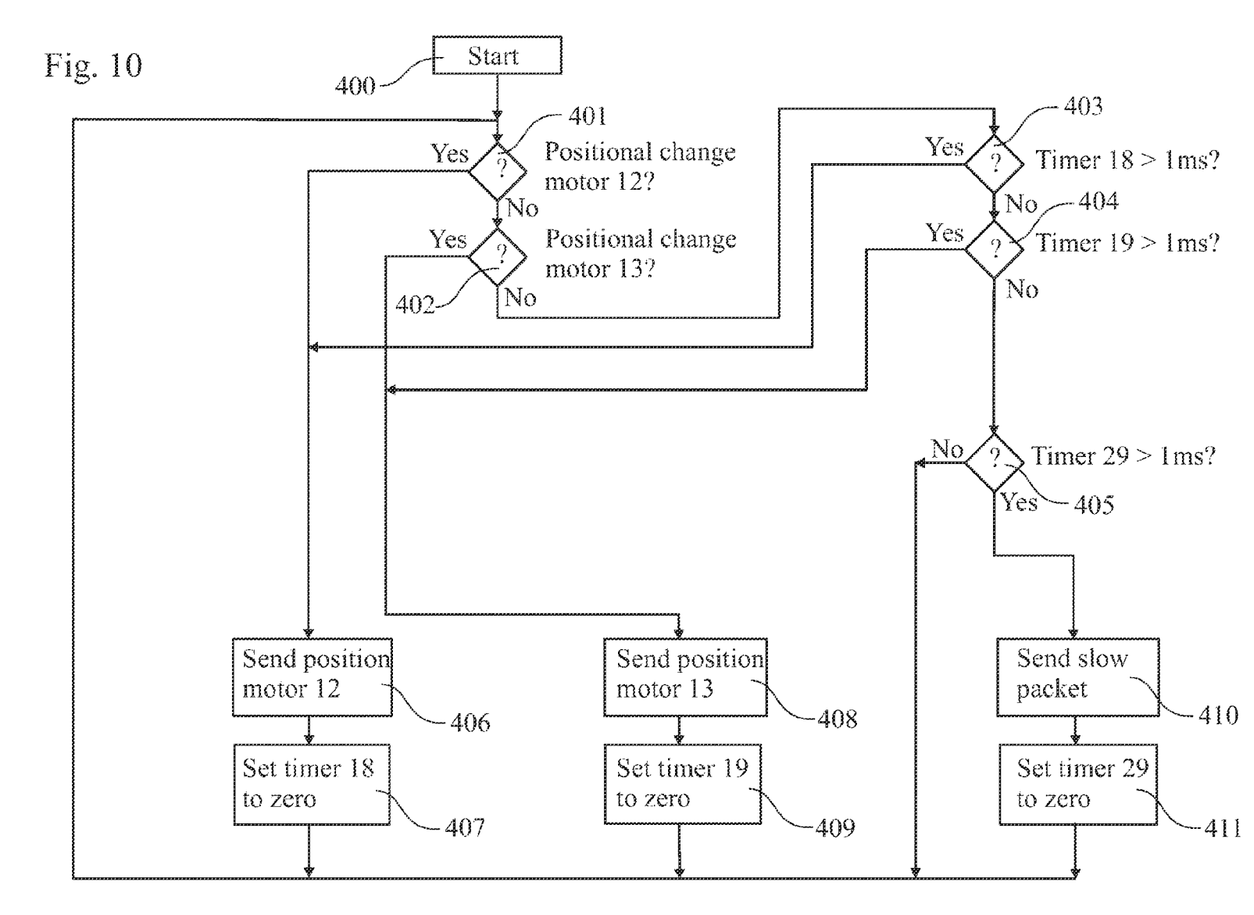
FIG. 10 shows a decision scheme determining which packet to be sent.

In this context it should be pointed out that the decision scheme of FIG. 10 determines whether to send a fast packet 40 comprising the electrical position or electrical positional change (1)-(6) of either the second motor 12 or the third motor 13, i.e. one of data code index 2-7 or 10-15, or whether a slow packet 50 comprising a portion of the slow message(s), i.e. data code index 1, 8, 9 or 16 is to be sent.

Figure 9:
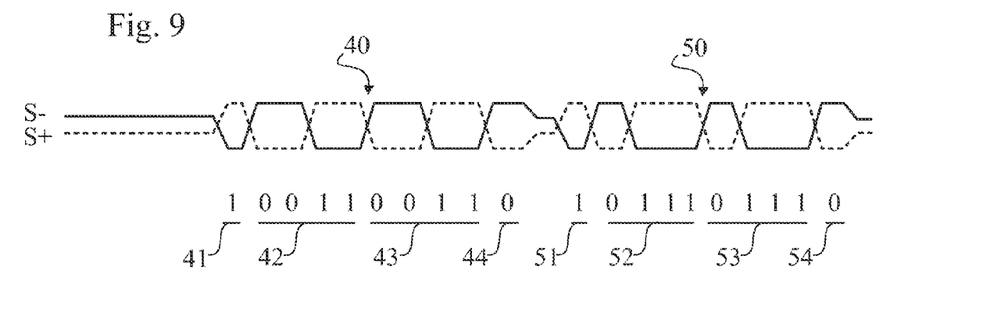
FIG. 9 is an example showing a fast packet and a slow packet over a serial communication line.

FIG. 9 shows an example of two data packets 40, 50 sent from the saw head control unit 17 to the power supply control unit 21. Each packets comprises four parts, a start bit 41, 51 indicating the start of the packet, an information code 42, 52, here shown as the code index 4 and code index 8, respectively (see FIG. 8), an error checking code 43, 53, here implemented by repeating the information code 42, 52, and a stop bit 44, 54 indicating the end of the packet. Thus each data package 40, 50 is has a bit length of 10 bits. Looking at information code 42 of the first 40 of the two shown data packets 40, 50, it can be seen from FIG. 8 that the information code 42 corresponds to the output from the Hall Effect sensors H1, H2, H3 of the second motor 12 when the rotor 31 is in the fifth (5) electrical position. The packets 40 referring to the Hall Effect sensors outputs from respective motor 12, 13 will hereafter be referred to as fast packets 40. The information code 52 of the second 50 of the two shown data packets 40,50 corresponds to a start bit in the slow message. The slow message is suitable for such information that does not need to be updated so quick nor so often in comparison to the electrical rotor positions (1)-(6) detected by the Hall Effect sensors H1, H2, H3 which are used for real-time control of the Pulse Width Modulators 22, 23. This could for example be a temperature reading of the first motor 5. The packets 50 referring to slow messages will hereafter be referred to as slow packets 50.

The slow message can thus be built up by sending slow packets 50 including information codes 51 relating to the slow message, whenever the communication line is free. Thus bit for bit the slow message is built up, when sending the slow packets 50. For instance the slow message could comprise a start bit (i.e. a slow packet 50 with code index 8), followed by 24 data bits (i.e. 24 slow packets 50 with code index 9 or 16) and a stop bit (i.e. a slow packet 50 with code index 1). Thus after a total of 26 slow packets 50, a slow message is finished.

The slow message could for instance be a value from an NTC-thermistor (NTC=Negative Temperature Coefficient) i.e. a temperature reading, a tool-ID (e.g. identifying which saw blade is used). For instance the first 8 bits of the 24 data bits could be an identifier, identifying which kind the message relates to (e.g NTC, ID, etc), i.e. a total of 256 different kinds could then be implemented. The following 8 bits could be the parameter value for the kind identified in the first 8 bits the message (e.g. a digitalised NTC-signal, a tool-ID, etc), i.e. 256 available values. The last 8 bits could e.g. be a checksum.

Since the communication between the saw head control unit 17 and the power supply unit 21 is performed by using serial communication (one packet a time), where each data packet 40, 50 includes only one information code 42, 52, i.e. the Hall effect sensor status of the second motor 12, the Hall effect sensor status of the third motor 13, or a bit of the slow message; the saw head control unit 17 may have to prioritise which information code 42, 52 to send first. Using a packet with a start bit and a stop bit with 8 bits there between, the communication speed using RS485 can be around 2.5 Mb/s, i.e. 4 µs per packet 40, 50. Thus normally, i.e. without collision, the Hall Effect sensor output is delayed by 4 µs to the power supply control unit 21. This corresponds to a delay of only a few degrees of the electrical cycle when running at full speed, e.g. if the electrical cycle time at full speed is 625 µs, the normal delay is around 2.3° of the electrical cycle of 360° (4 µs/625 µs), and of course even lower when running at lower speeds.

A Hall effect sensor status from one motor 12, 13 will normally not come in conflict with a Hall effect sensor output from the same motor 12, 13, but since the second and third motor 12, 13 are not synchronised the Hall effect sensor output corresponding to respective motor 12, 13 may happen at the same time or so close that one of the Hall effect sensors outputs may have to wait. For instance a motor running at full speed can provide around 9600 Hall Effect sensor outputs per second, which on average is 104 µs between these outputs. Since a packet takes only 4 µs to send, the Hall Effect sensor output from respective motor should then only rarely collide. In case of collision the packet will be delayed additional 4 µs, which e.g. corresponds to around 4.6° of the electrical cycle of 360° (8 µs/625 µs) at full speed. Such a delay is acceptable.

However, the slow messages are also to be sent on the same serial line. The slow messages comprises information which are not needed to be sent as quickly as the phase commuting feedback of the Hall Effect sensors H1, H2, H3. To avoid that the slow packets 50 of the slow messages collide with sending a fast packet, delaying the fast packet 40, the slow packets are sent shortly after a Hall Effect sensors has delivered an output, preferably from both of the motors 12, 13.

FIG. 10 shows a decision scheme deciding which packet 40, 50 to be sent. The saw head control unit 17 includes three timers 18, 19, 29 that are used in the control scheme, a first timer 18 counting the time since the latest fast packet 40 with an information code 42 relating to the electrical position (1)-(6) of the second motor 12 was sent, a second timer 19 counting the time since the latest fast packet 40 with an information code 42 relating to the electrical position (1)-(6) of the third motor 13 was sent, and a third timer 29 counting the time since the latest slow packet 50 was sent.

Box 400: At start of the scheme this timer 18, 19, 29 are all set to zero. Box 401 follows.

Box 401: "Positional change motor 12?" checks whether the Hall Effect sensors H1, H2, H3 of the second motor 12 has delivered a new position (1)-(6). If yes, Box 410 follows for sending a fast packet 40 with positional information. If no, Box 402 follows.

Box 402: "Positional change motor 13" checks whether the Hall Effect sensors H1, H2, H3 of the third motor 13 has delivered a new position (1)-(6). If yes, Box 412 follows for sending a fast packet 40 with positional information. If no, Box 403 follows.

Box 403: "Timer 18>1 ms" checks if the latest fast packet 40 relating to the electrical position (1)-(6) of second motor 12 was sent for more than 1 millisecond ago, of course this time threshold could be set differently e.g. less than 5 ms. This makes sure that a Hall Effect output is sent even if the positional change was missed and it also provides positional information from the Hall Effect sensors even when second motor 12 is at rest, so that the electrical positions of second motor 12 is known at start. If yes, Box 406 follows for sending a fast packet 40 with positional information. If no, Box 404 follows.

Box 404: "Timer 19>1 ms" checks if the latest fast packet 40 relating to the electrical position (1)-(6) of third motor 13 was sent for more than 1 millisecond ago, of course this time threshold could be set differently e.g. less than 5 ms. This makes sure that a Hall Effect output is sent even if the positional change was missed and it also provides positional information from the Hall Effect sensors even when third motor 13 is at rest, so that the electrical positions of third motor 13 is known at start. If yes, Box 408 follows for sending a fast packet 40 with positional information. If no, Box 405 follows.

Box 405: "Timer 29>1 ms" checks if the latest slow packet 50 was sent for more than 1 millisecond ago. This box is optional and keeps down the sending rate of the slow packets 50 to maximum every 1 ms, of course this time threshold could be set differently e.g. less than 5 ms. If yes, Box 410 follows. If no, Box 401 follows.

Box 406: "Send position motor 12" sends a fast packet 40 including the status of the electrical position (1)-(6) of the second motor 12. Box 407 follows.

Box 407: "Set timer 18 to zero" resets the timer 18 after a fast packet 40 of Box 406 has been sent. The loop of the control scheme thereafter returns to Box 401.

Box 408: "Send position motor 13" sends a fast packet 40 including the status of the electrical position (1)-(6) of the second motor 13. Box 409 follows.

Box 409: "Set timer 19 to zero" resets the timer 19 after a fast packet 40 of Box 408 has been sent. The loop of the control scheme thereafter returns to Box 401.

Box 410: "Send slow packet 50" sends a slow packet 50 including a bit in the slow message. Thus a slow packet 50 is sent after that the position of motor 12 and 13 are sent, minimising the risk that the slow packet 50 is delaying a fast packet 40. Thus normally the only delay may occur from collision between simultaneous positional changes of respective motor 12, 13. Thereby the delays for the fast packets 40 are minimised. The only risk for a collision with a slow packet is if the motor runs very slow, however then the delay of one extra packet time is irrelevant. Box 411 follows.

Box 411: "Set timer 29 to zero" resets the timer 29 after a slow packet 40 of Box 410 has been sent. The loop of the control scheme thereafter returns to Box 401.

Whereas the invention has been shown and described in connection with the preferred embodiments thereof it will be understood that many modifications, substitutions, and additions may be made which are within the intended broad scope of the following claims. From the foregoing, it can be seen that the present invention accomplishes at least one of the stated objectives.

Of course the number of teeth of the stator can be varied as well as the number of permanent magnets of the rotor.

Of course other checksums than repeating the sequence can be used.

The invention claimed is:

1. An electric saw being portable and/or wheeled comprising:
    a circular rotatable saw blade;
    a drive motor for driving the saw blade, the drive motor having a first sensor associated therewith;
    a second electric motor for moving the saw along a surface to be sawn, the second electric motor having a second sensor associated therewith;
    a third electric motor for raising and lowering the saw blade, the third electric motor having a third sensor associated therewith;
    a multicore cable comprising communication wires and power wires;
    a power supply which controls the supply of power to the drive motor, the second motor, and the third motor using the power wires; a remote control unit in digital data communication with the power supply, said power supply is in data communication with the drive motor, the first sensor, the second sensor, and the third sensor using the communication wires; and
    wherein control of the drive motor, the second motor, and the third motor, by the power supply, is based, at least in part, on input from the first sensor, the second sensor, and the third sensor, and
    wherein the first sensor monitors a first monitored parameter of a different type than a second monitored parameter monitored by the second sensor and the third sensor.

2. An electric saw according to claim 1, wherein the communication wires are used for transmitting the second monitored parameter, wherein the second monitored parameter is the electrical position or positional change of the second motor and the third motor to the power supply and that the power supply includes commutation means for commutating electrical phases for the corresponding second motor or third motor based on the received electrical position or positional change of the motor thereof.

3. An electric saw according to claim 1, wherein the second motor or the third motor is an electrical motor having an inner stator and an outer rotor comprising a plurality of permanent magnets, and wherein the at least one sensor comprises at least three Hall Effect sensors mounted around the periphery of the outer rotor for determining the electrical position and/or electrical positional change by monitoring the leak magnetic flux of the permanent magnets.

4. An electric saw according to claim 1, wherein the saw comprises a rack intended to be fastened to, or in close proximity to, an object to be sawn so that movable parts of the saw can move along the rack during sawing.

5. An electric saw according to claim 1, wherein the multi core cable further comprises two wires for data transfer.

6. An electric saw according to claim 5, wherein the two wires for data transfer are twisted.

7. The electric saw according to claim 1, wherein the power wires comprise three sets of power wires, and the communication wires comprise two communication wires and one ground wire, wherein each set of power wires comprises three lines, one for each electric phase.

8. The electric saw according to claim 7, wherein a first set of the three sets of power wires is for powering the first electric motor, a second set of the three sets of power wires is for powering the second electric motor, and a third set of the three sets of power wires is for powering the third motor.

9. The electric saw according to claim 1, wherein the first monitored parameter is temperature.

* * * * *